(12) United States Patent
Tachibanada et al.

(10) Patent No.: US 9,951,864 B2
(45) Date of Patent: Apr. 24, 2018

(54) CONTROL APPARATUS FOR AN AUTOMATIC TRANSMISSION

(71) Applicant: HONDA MOTOR CO., LTD., Tokyo (JP)

(72) Inventors: Yuya Tachibanada, Wako (JP); Yutaka Ishikawa, Wako (JP); Aaron Hoover, Torrance, CA (US)

(73) Assignee: HONDA MOTOR CO., LTD., Tokyo (JP)

( * ) Notice: Subject to any disclaimer, the term of this patent is extended or adjusted under 35 U.S.C. 154(b) by 139 days.

(21) Appl. No.: 14/939,048

(22) Filed: Nov. 12, 2015

(65) Prior Publication Data

US 2017/0138465 A1   May 18, 2017

(51) Int. Cl.
*F16H 3/66* (2006.01)
*F16H 61/02* (2006.01)

(52) U.S. Cl.
CPC .......... *F16H 61/0204* (2013.01); *F16H 3/66* (2013.01); *F16H 2200/0069* (2013.01); *F16H 2200/2012* (2013.01); *F16H 2200/2048* (2013.01); *F16H 2200/2066* (2013.01); *F16H 2200/2082* (2013.01)

(58) Field of Classification Search
CPC ...................... F16H 2061/0462; F16H 2312/09
See application file for complete search history.

(56) References Cited

U.S. PATENT DOCUMENTS

| 4,768,636 A * | 9/1988 | Ito .......................... B60W 10/02 192/222 |
| 9,140,358 B2 | 9/2015 | Tachibanada et al. |
| 2009/0013810 A1* | 1/2009 | Nakagawa ............ B60W 10/02 74/335 |
| 2014/0256497 A1* | 9/2014 | Ishikawa ................. F16H 61/16 475/269 |
| 2014/0303860 A1 | 10/2014 | Tachibanada et al. |

FOREIGN PATENT DOCUMENTS

JP          2014-202340 A     10/2014

* cited by examiner

*Primary Examiner* — Huan Le
*Assistant Examiner* — Lori Wu
(74) *Attorney, Agent, or Firm* — Westerman, Hattori, Daniels & Adrian, LLP

(57) ABSTRACT

This invention provides a control apparatus for an automatic transmission, which includes a plurality of engaging mechanisms. The plurality of engaging mechanisms includes a mechanical engaging mechanism configured to function as a brake. The mechanical engaging mechanism can be switched between a first state in which rotation of a rotational element is restricted only in one direction and a second state in which the rotation is restricted in both directions. When switching from the first state to the second state, the control apparatus executes engagement control to set a plurality of hydraulic friction engaging mechanisms in an engaging state. Control to set a predetermined hydraulic friction engaging mechanism in a half-engaging state and brake an output member can be executed in parallel to the engagement control.

10 Claims, 12 Drawing Sheets

FIG. 2A

|      | C1 | C2 | C3 | B1 | B2 | B3 | F1 | GEAR RATIO |
|------|----|----|----|----|----|----|----|------------|
| RVS  |    |    | ○  |    | ○  |    | ○  | 4.008 |
| 1st  |    |    |    | ○  | ○  |    | △/○ | 5.233 |
| 2nd  |    | ○  |    | ○  | ○  |    | (△) | 3.367 |
| 3rd  |    |    | ○  | ○  | ○  |    | (△) | 2.298 |
| 4th  |    | ○  | ○  | ○  |    |    | (△) | 1.705 |
| 5th  | ○  |    | ○  | ○  |    |    | (△) | 1.363 |
| 6th  | ○  | ○  | ○  |    |    |    | (△) | 1.000 |
| 7th  | ○  |    | ○  |    | ○  |    | (△) | 0.786 |
| 8th  | ○  | ○  |    |    | ○  |    | (△) | 0.657 |
| 9th  | ○  |    |    |    | ○  | ○  | (△) | 0.584 |
| 10th | ○  | ○  |    |    |    | ○  | (△) | 0.520 |
| P/N  |    |    |    |    |    |    | △/○ | —     |
| RPM  | ○  |    | ○  | (□)| □  | ○  | △→○ | —     |

FIG. 2B

| PLANETARY GEAR MECHANISM | GEAR RATIO |
|---|---|
| P1 | 2.681 |
| P2 | 1.914 |
| P3 | 1.614 |
| P4 | 2.734 |

F I G. 4B
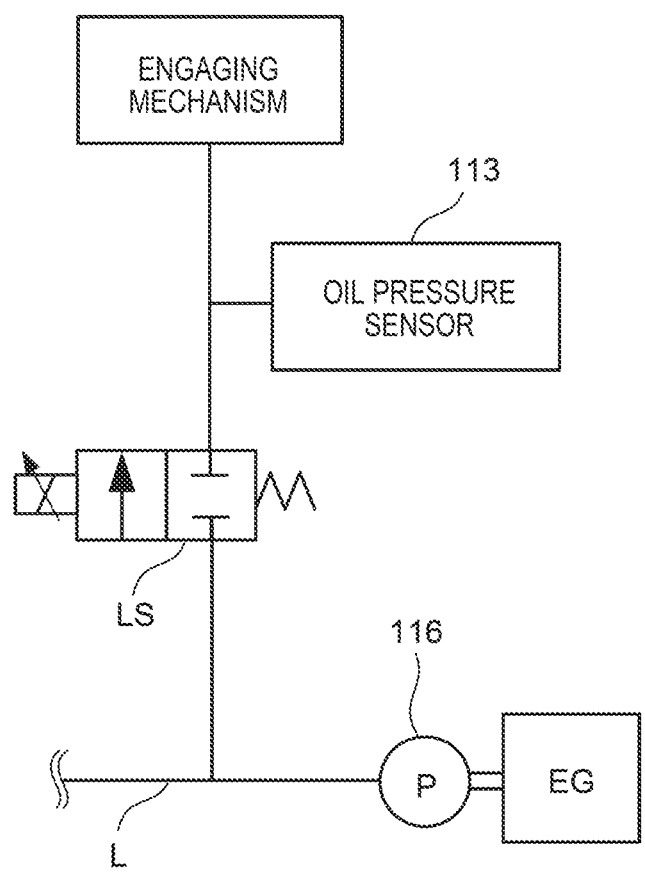

F I G. 5

| STEP | ENGAGING OPERATION | | | | | | |
|---|---|---|---|---|---|---|---|
| 1 | B3 — | B2 ↓ | B1 ↓ | C3 — | C2 — | C1 — | F1 △ |
| 2 | B3 ○ | B2 □ | B1 (□) | C3 ○ | C2 — | C1 ○ | F1 △ |
| 3 | B3 ○ | B2 □ | B1 — | C3 ○ | C2 — | C1 ○ | F1 ○ |
| 4 | B3 ↓ | B2 ○ | B1 — | C3 ○ | C2 — | C1 ↓ | F1 ○ |

↓ : RELEASING
○ : ENGAGE
— : RELEASE
□ : HALF-ENGAGE
F1/△ : ONE-WAY ROTATION PERMISSION
F1/○ : ROTATION INHIBITION

CONTROL APPARATUS FOR AN AUTOMATIC TRANSMISSION

BACKGROUND OF THE INVENTION

Field of the Invention

The present invention relates to a control apparatus for an automatic transmission.

Description of the Related Art

An automatic transmission generally includes planetary gear mechanisms and engaging mechanisms such as a clutch and a brake, and implements each gear range by switching the power transmission path by the engaging mechanisms. As the engaging mechanisms, employing a mechanical engaging mechanism has been proposed in addition to a hydraulic engaging mechanism. In particular, an arrangement that uses a clutch (two-way clutch) capable of switching to a state to do two-way rotation restriction as a brake has been proposed (for example, Japanese Patent Laid-Open No. 2014-202340).

When the two-way clutch is used as a brake, a rotational element connected to the two-way clutch can be switched between a state in which rotation is restricted only in one direction (rotation in the reverse direction is permitted) and a state in which rotation is restricted in both directions. When switched to the state in which rotation is restricted in both directions, the rotational element connected to the two-way clutch is fixed to the casing. For this reason, if switching is done during rotation of the rotational element, unusual noise or vibration occurs, and the two-way clutch breaks. To prevent this, switching may be performed via an engaging combination that brings the rotational element to a standstill.

In an arrangement that switches the two-way clutch to the state in which rotation is restricted in both directions when switching the gear range from the forward range to the reverse range, processing of switching the state of the two-way clutch is needed before the reverse range is put in gear. During this processing, if the driving transmission between the input shaft and the output member of the automatic transmission is disconnected, and the driving wheels are freely rotatable, the sense of response to the shift operation to the reverse range may be weak.

SUMMARY OF THE INVENTION

It is an object of the present invention to suppress unusual noise or vibration when switching a mechanical engaging mechanism, and improve the sense of response to the shift operation from the forward range to the reverse range.

According to an aspect of the present invention, there is provided a control apparatus for an automatic transmission, the automatic transmission including: an input shaft to which a driving force is input; an output member; a plurality of planetary gear mechanisms configured to transmit the driving force input to the input shaft to the output member; and a plurality of engaging mechanisms capable of establishing a plurality of gear ranges by switching a transmission path of the driving force in the plurality of planetary gear mechanisms, wherein the plurality of engaging mechanisms include: a mechanical engaging mechanism configured to function as a brake; and a plurality of hydraulic friction engaging mechanisms, the mechanical engaging mechanism can be switched between a first state in which rotation of a predetermined rotational element, out of a plurality of rotational elements included in the plurality of planetary gear mechanisms, is restricted only in one direction and a second state in which the rotation of the predetermined rotational element is restricted in both directions, the plurality of gear ranges include: at least one forward range that can be established in the first state of the mechanical engaging mechanism; and a reverse range to be established in the second state of the mechanical engaging mechanism, the control apparatus comprising: a detection unit configured to detect a shift position; and a control unit configured to control the plurality of engaging mechanisms, wherein the control unit can execute switching control to switch the mechanical engaging mechanism from the first state to the second state when switching of the shift position from the forward range to the reverse range is detected, in the switching control, after engagement control for setting a plurality of hydraulic friction engaging mechanisms selected from the plurality of hydraulic friction engaging mechanisms in an engaging state, the mechanical engaging mechanism is switched from the first state to the second state, and the control unit can execute half-engagement control to brake the output member by setting at least one hydraulic friction engaging mechanism selected from the plurality of hydraulic friction engaging mechanisms in a half-engaging state in parallel to the engagement control.

Further features of the present invention will become apparent from the following description of exemplary embodiments (with reference to the attached drawings).

BRIEF DESCRIPTION OF THE DRAWINGS

FIG. 2A is a view showing an example of the engagement table of engaging mechanisms;

FIG. 2B is a view showing the gear ratios of planetary gear mechanisms;

FIG. 4B is a view showing an example of the arrangement of an oil pressure sensor;

FIG. 5 is a view for explaining the outline of processing performed when the reverse range is selected;

DESCRIPTION OF THE EMBODIMENTS

Figure 1:
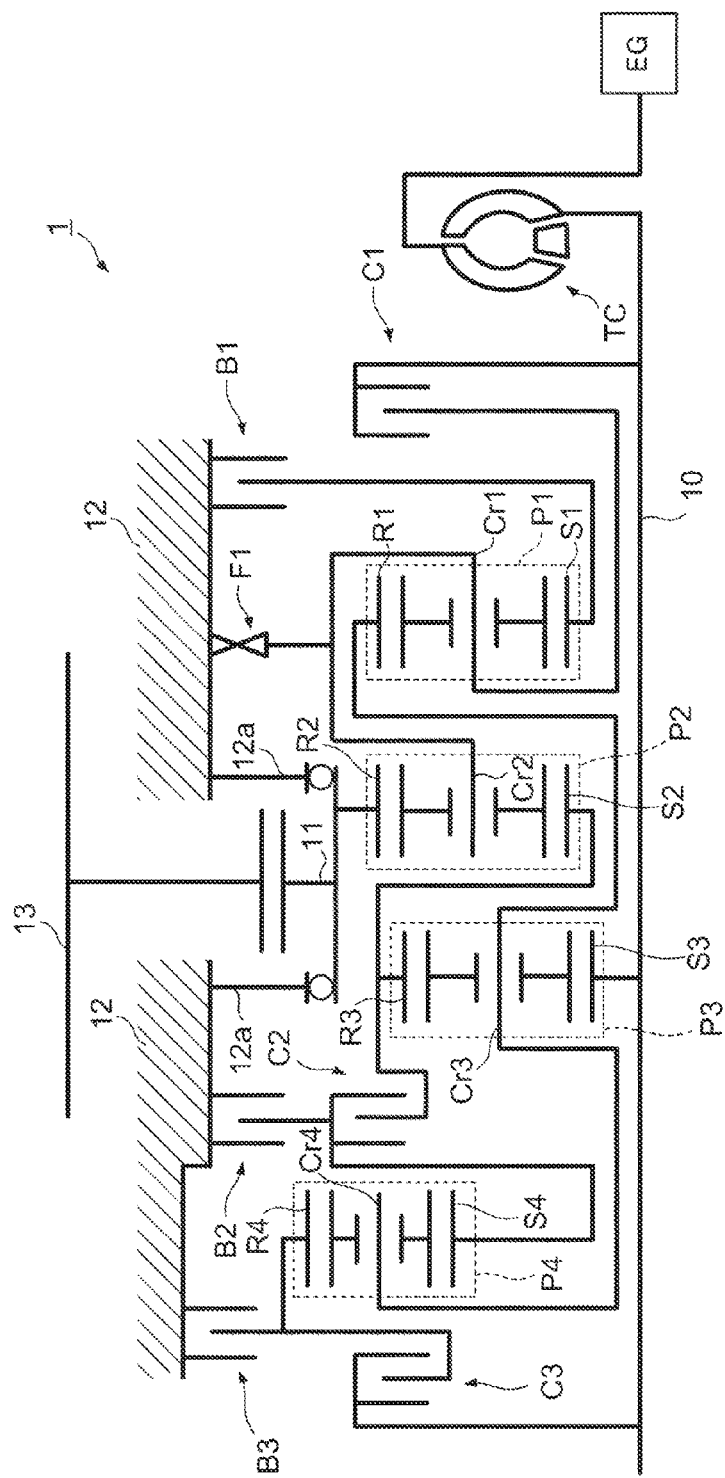
FIG. 1 is a skeleton diagram of an automatic transmission according to an embodiment of the present invention.

FIG. 1 is a skeleton diagram of an automatic transmission 1 according to an embodiment of the present invention. Referring to FIG. 1, the automatic transmission 1 includes an input shaft 10 rotatably axially supported in a casing 12 that forms a transmission case, an output member 11 rotatably supported by support members 12a supported in the casing 12 so as to be coaxial with respect to the input shaft 10, and an output shaft (counter shaft) 13.

A driving force from an internal combustion engine EG (to be sometimes simply referred to as EG) is input to the input shaft 10, and the input shaft 10 is rotated by the driving force. A starting device is provided between the input shaft 10 and the internal combustion engine EG. Examples of the starting device are a clutch type starting device (single disc clutch, multiple disc clutch, or the like) and a hydraulic coupling type starting device (torque converter or the like). In this embodiment, a torque converter TC is provided. Hence, the driving force of the internal combustion engine EG is input to the input shaft 10 through the torque converter TC.

The output member 11 includes a gear concentric to the input shaft 10. The output shaft 13 includes a gear that engages with the gear. The rotation of the input shaft 10 changes its speed through transmission mechanisms to be described below and is then transmitted to the output shaft 13. The rotation (driving force) of the output shaft 13 is transmitted to driving wheels through, for example, differential gears (not shown).

As the transmission mechanisms, the automatic transmission 1 includes planetary gear mechanisms P1 to P4 and engaging mechanisms C1 to C3, B1 to B3, and F1. In this embodiment, the planetary gear mechanisms P1 to P4 are single pinion type planetary gear mechanisms. The planetary gear mechanisms P1 to P4 transmit the driving force from the input shaft 10 to the output member 11. The planetary gear mechanisms P1 to P4 can form a plurality of driving force transmission paths. The engaging mechanisms C1 to C3, B1 to B3, and F1 switch the driving force transmission paths of the planetary gear mechanisms P1 to P4, thereby establishing a plurality of gear ranges.

The planetary gear mechanisms P1 to P4 include sun gears S1 to S4, ring gears R1 to R4, and carriers Cr1 to Cr4 each supporting a pinion gear, respectively, as rotational elements (12 in total), and are disposed to be coaxial with respect to the input shaft 10.

When ordered in accordance with the arrangement order at intervals corresponding to gear ratios shown in the velocity diagram of FIG. 3 (to be described later), the sun gear S1, the carrier Cr1, and the ring gear R1 of the planetary gear mechanism P1 can be referred to as a first rotational element, a second rotational element, and a third rotational element in this order.

Similarly, the sun gear S2, the carrier Cr2, and the ring gear R2 of the planetary gear mechanism P2 can be referred to as a fourth rotational element, a fifth rotational element, and a sixth rotational element in this order.

Similarly, the sun gear S3, the carrier Cr3, and the ring gear R3 of the planetary gear mechanism P3 can be referred to as a seventh rotational element, an eighth rotational element, and a ninth rotational element in this order.

Similarly, the sun gear S4, the carrier Cr4, and the ring gear R4 of the planetary gear mechanism P4 can be referred to as a 10th rotational element, a 11th rotational element, and a 12th rotational element in this order.

Each of the engaging mechanisms C1 to C3, B1 to B3, and F1 functions as a clutch or a brake. A clutch connects/disconnects the rotational elements provided in the automatic transmission 1. A brake connects/disconnects the rotational elements provided in the automatic transmission 1 to/from the casing 12. The rotational elements provided in the automatic transmission 1 include the input shaft 10 and the sun gears, ring gears, and carriers of the planetary gear mechanisms P1 to P4.

In this embodiment, the engaging mechanisms C1 to C3 are clutches, and the engaging mechanisms B1 to B3 and F1 are brakes. Hence, the engaging mechanisms C1 to C3 are sometimes called the clutches C1 to C3, and the engaging mechanisms B1 to B3 and F1 are sometimes called the brakes B1 to B3 and F1. When the engaging mechanisms C1 to C3 and B1 to B3 are switched between an engaging state (fastening state) and a release state (disengaging state), and the state of the engaging mechanism F1 is switched, the driving force transmission path from the input shaft 10 to the output member 11 is switched, and the plurality of gear ranges are implemented.

In this embodiment, all the engaging mechanisms C1 to C3 and B1 to B3 are assumed to be hydraulic friction engaging mechanisms. Examples of the hydraulic friction engaging mechanism are dry and wet single disc clutches and dry and wet multiple disc clutches.

The engaging mechanism F1 is provided between the casing 12 and predetermined rotational elements (here, the carriers Cr1 and Cr2 connected to each other). The engaging mechanism F1 can be switched between a one-way rotation permission state (to be sometimes referred to as OWC) in which the rotation of the predetermined rotational elements (carriers Cr1 and Cr2) is restricted only in one direction, and rotation in the reverse direction is permitted and a rotation inhibition state (to be sometimes referred to as TWC) in which rotation is restricted in both directions.

In the one-way rotation permission state, the same function as a so-called one-way clutch is implemented. In this state, the rotational elements transmit the driving force in one rotation direction but slip in the reverse direction. In this embodiment, the engaging mechanism F1 functions as a brake. For this reason, if the engaging mechanism F1 is in the one-way rotation permission state, the predetermined rotational elements (carriers Cr1 and Cr2) are permitted to rotate only in one direction. In the rotation inhibition state, the rotational elements transmit the driving force in both rotation directions. In this embodiment, the engaging mechanism F1 functions as a brake. For this reason, if the engaging mechanism F1 is in the rotation inhibition state, the predetermined rotational elements (carriers Cr1 and Cr2) are inhibited from rotating in both directions.

As the engaging mechanism F1, for example, a known two-way clutch can be employed. Some known two-way clutches can be switched between the one-way rotation permission state, the rotation inhibition state, and a two-way rotation permission state by driving control of a corresponding hydraulic actuator or electromagnetic actuator. Some known two-way clutches can further switch the one-way rotation permission state between a forward rotation permission state and a reverse rotation permission state. In this embodiment, switching between the one-way rotation permission state and the rotation inhibition state suffices, and using only the permission state in one rotation direction as the one-way rotation permission state suffices. However, a two-way clutch capable of selecting another state such as the two-way rotation permission state may be employed.

The connection relationship between the components will be described next with reference to FIG. 1.

The sun gear S3 of the planetary gear mechanism P3 is connected to the input shaft 10. The ring gear R3 is connected to the sun gear S2 of the planetary gear mechanism P2. The carrier Cr3 is connected to the ring gear R1 of the planetary gear mechanism P1 and the carrier Cr4 of the planetary gear mechanism P4. The carrier Cr2 of the planetary gear mechanism P2 is connected to the carrier Cr1 of the planetary gear mechanism P1. The ring gear R2 is connected to the output member 11. Hence, the planetary gear mechanism P2 transmits the driving force to the output shaft 13.

The clutch C1 connects the input shaft 10 to the carrier Cr1 of the planetary gear mechanism P1 and the carrier Cr2 connected to the carrier Cr1 in the engaging state, and disconnects them in the release state. The clutch C2 connects the ring gear R3 of the planetary gear mechanism P3 to the sun gear S4 of the planetary gear mechanism P4 in the engaging state, and disconnects them in the release state. The clutch C3 connects the input shaft 10 to the ring gear R4 of the planetary gear mechanism P4 in the engaging state, and disconnects them in the release state.

The brake B1 connects the casing 12 to the sun gear S1 of the planetary gear mechanism P1 in the engaging state, and disconnects them in the release state. The brake B2 connects the casing 12 to the sun gear S4 of the planetary gear mechanism P4 in the engaging state, and disconnects them in the release state. The brake B3 connects the casing 12 to the ring gear R4 of the planetary gear mechanism P4 in the engaging state, and disconnects them in the release state.

As already described, the brake F1 restricts the rotation of the carrier Cr2 of the planetary gear mechanism P2 (and the carrier Cr1 connected to the carrier Cr2) only in one direction in the one-way rotation permission state, and fixes the carrier Cr2 of the planetary gear mechanism P2 (and the carrier Cr1 connected to the carrier Cr2) to the casing 12 in the rotation inhibition state.

FIG. 2A is an engagement table (fastening table) showing the engaging combination of the engaging mechanisms provided in the automatic transmission 1. FIG. 2B shows the gear ratios of the planetary gear mechanisms provided in the automatic transmission 1. FIG. 3 is a velocity diagram of the automatic transmission 1. "Gear ratio" in FIG. 2A indicates the gear ratio between the input shaft 10 and the output member 11.

In this embodiment, 10 forward ranges (1st to 10th) and one reverse range (RVS) can be established. "P/N" represents non-running ranges; "P", a parking range; and "N", a neutral range. "RPM" represents an engaging combination in RVS preparation processing (to be described later). In this processing, the brake F1 is switched from the one-way rotation permission state to the rotation inhibition state.

In the example of the engaging table shown in FIG. 2A, "○" indicates the engaging state, and no mark indicates the release state. In "RPM", "□" indicates a half-engaging state (brake B2), and "(□)" indicates a half-engaging state or a release state (brake B1).

Note that there are included engaging mechanisms that are set in the engaging state for smooth change to adjacent gear ranges, although the engagement is not essential to establish the gear ranges. For example, in the first range (1st), engagement of the brake B2 is not essential. However, when changing to the reverse range (RVS) or second range (2nd), the brake B2 is set in the engaging state for the purpose of decreasing the engaging mechanisms to switch the engaging state. Similarly, in the fifth range (5th), engagement of the clutch C3 is not essential. However, when changing to the fourth range (4th) or sixth range (6th), the clutch C3 is set in the engaging state for the purpose of decreasing the engaging mechanisms to switch the engaging state.

As for the brake F1, "○" indicates the rotation inhibition state, and "Δ" indicates the one-way rotation permission state. In the first range (1st), the brake F1 can be set in either the rotation inhibition state or the one-way rotation permission state. In the rotation inhibition state, the engine brake is enabled. In the one-way rotation permission state, the engine brake does not take hold. An algorithm to set the brake F1 in one of the states in the first range (1st) can appropriately be designed. For example, the state before a change to the first range (1st) is inherited. More specifically, when changed from the reverse range (RVS) to the first range (1st), the brake F1 remains in the rotation inhibition state in the first range (1st). However, if, for example, the vehicle speed exceeds a predetermined speed, the brake F1 may be switched to the one-way rotation permission state. Similarly, when changed from other forward ranges (2nd to 10th) to the first range (1st), the brake F1 remains in the one-way rotation permission state in the first range (1st).

In the non-running ranges (P/N) as well, the state of the brake F1 can be either the rotation inhibition state or the one-way rotation permission state. Hence, the state before a change to the non-running ranges (P/N) may be inherited, as in the first range (1st).

In the second range (2nd) to the 10th range (10th), the brake F1 is set in the one-way rotation permission state, but slips because of the structure of the automatic transmission 1. For this reason, the state of the brake F1 is indicated by "(Δ)". If the brake F1 is a mechanical engaging mechanism capable of selecting the above-described two-way rotation permission state, it can be set in the two-way rotation permission state in the second range (2nd) to the 10th range (10th).

Note that in this embodiment, in the second range (2nd) to the 10th range (10th), the one-way rotation permission state is selected as the state of the brake F1. However, depending on the structure of the automatic transmission 1, an arrangement for selecting the rotation inhibition state can also be employed.

Figure 3:
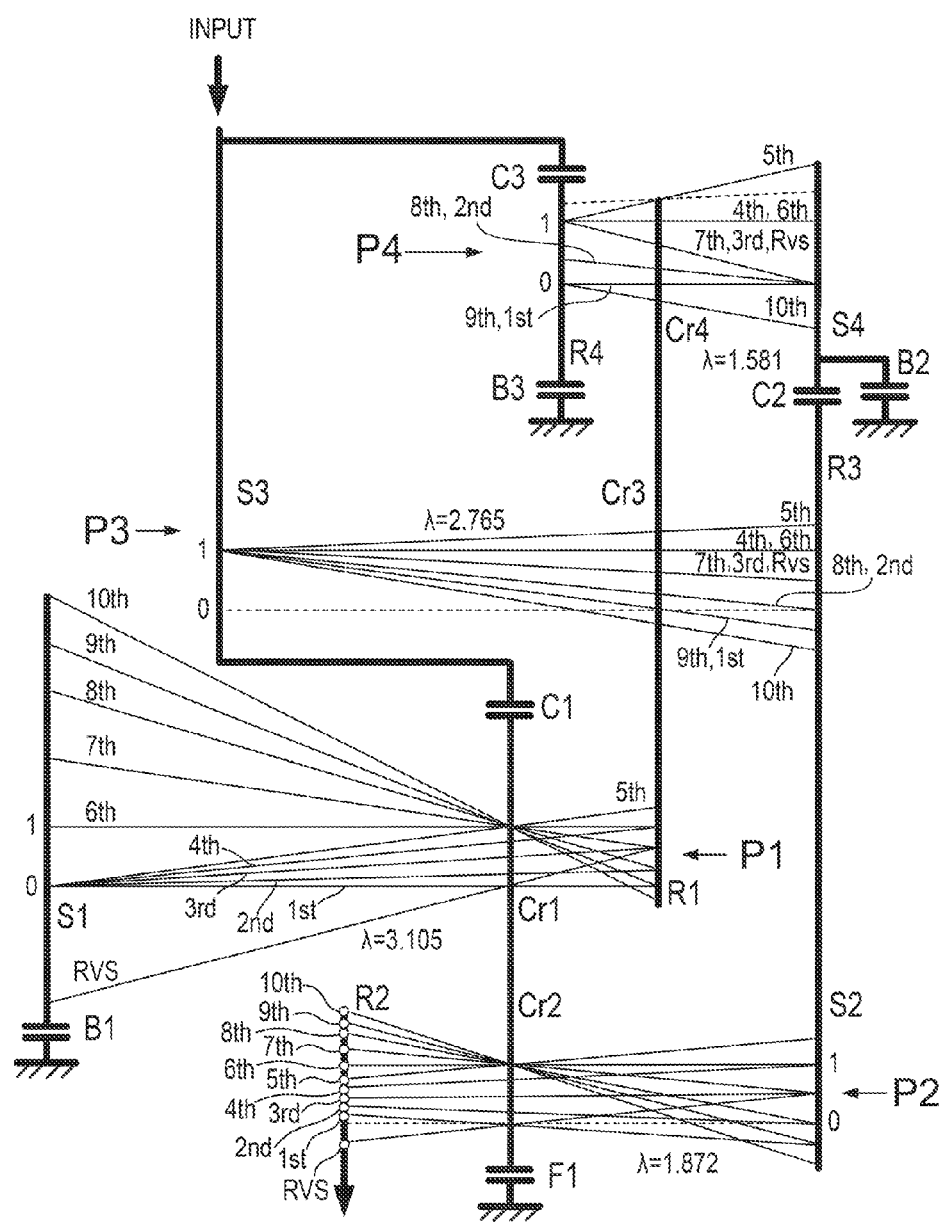
FIG. 3 is a velocity diagram of the automatic transmission shown in FIG. 1.

The velocity diagram of FIG. 3 shows the rotation speed ratio of each element to the input to the input shaft 10 in each gear range. The ordinate represents the speed ratio. "1" indicates the same rotation speed as the input shaft 10, and "0" indicates a stop state. The abscissa is based on the gear ratio between the rotational elements of the planetary gear mechanisms P1 to P4. λ is the gear ratio between a carrier Cr and a sun gear S. Note that in FIG. 3, elements corresponding to the output shaft 13 are not illustrated.

<Control Apparatus>

Figure 4A:
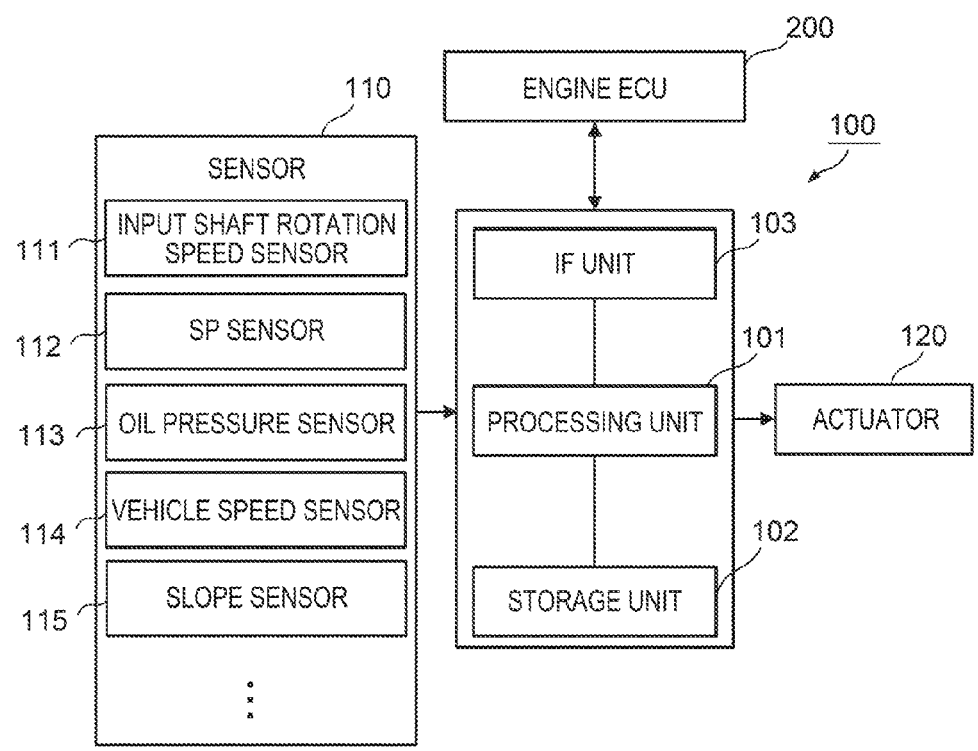
FIG. 4A is a block diagram showing an example of the control apparatus of the automatic transmission shown in FIG. 1.

FIG. 4A is a block diagram of a control apparatus 100 of the automatic transmission 1. The control apparatus 100 can control not only the automatic transmission 1 but also the internal combustion engine EG and the torque converter TC. In this embodiment, the internal combustion engine EG is assumed to be controlled by an engine ECU 200 provided independently of the control apparatus 100. The control apparatus 100 can receive various kinds of information of the internal combustion engine EG and the vehicle from the engine ECU 200. The control apparatus 100 can also transmit the information of the automatic transmission 1 to the engine ECU 200.

The control apparatus 100 includes a processing unit 101 such as a CPU, a storage unit 102 such as a RAM and ROM, and an IF unit 103 that interfaces the processing unit 101 and an external device or the engine ECU. The IF unit 103 is formed from, for example, a communication interface, an input/output interface, or the like.

The processing unit 101 executes a program stored in the storage unit 102 and controls various kinds of actuators 120 based on the detection results of various kinds of sensors 110.

The various kinds of sensors 110 include various kinds of sensors provided in the automatic transmission 1. FIG. 4A illustrates the following sensors.

An input shaft rotation speed sensor 111 detects the rotation speed of the input shaft 10. An SP sensor (shift position sensor) 112 detects a shift position selected by the driver. In this embodiment, four types of shift positions, that is, P range (parking range), D range (forward range), N range (neutral range), and R range (reverse range) are assumed. If the D range is selected, the processing unit 101 selects one of the first range (1st) to the 10th range (10th) in accordance with a gear change map stored in the storage unit 102 and changes the gear. If the R range is selected, the processing unit 101 selects the reverse range.

An oil pressure sensor 113 includes a sensor that detects the oil pressure of hydraulic oil in each of the engaging mechanisms C1 to C3 and B1 to B3. A vehicle speed sensor 114 detects the traveling speed of the vehicle on which the automatic transmission 1 is mounted. A slope sensor 115 detects the slope of the traveling road of the vehicle. Whether the vehicle is climbing a hill can thus be detected.

The various kinds of actuators 120 include various kinds of actuators provided in the automatic transmission 1. For example, the actuators 120 include an electromagnetic actuator such as an electromagnetic solenoid that switches the operation state of each of the engaging mechanisms C1 to C3, B1 to B3, and F1. The processing unit 101 thus controls the various kinds of actuators 120.

FIG. 4B shows an example of the arrangement of the oil pressure sensor 113. The oil pressure sensor 113 can be provided for, for example, each of the engaging mechanisms C1 to C3 and B1 to B3. The oil pressure of hydraulic oil in each engaging mechanism can thus be detected. Note that the oil pressure sensor 113 need not always be provided for each engaging mechanism.

A solenoid valve LS for supplying hydraulic oil is assigned to each engaging mechanism. A supply line L of hydraulic oil is opened or closed by the solenoid valve LS, thereby switching the engaging and release states of each engaging mechanism. The oil pressure sensor 113 is provided so as to receive the hydraulic oil supplied from the solenoid valve LS to the engaging mechanism. The detection result of the oil pressure sensor 113 represents the oil pressure of the hydraulic oil supplied to the engaging mechanism. An oil pump 116 driven by the internal combustion engine EG forces the hydraulic oil into the supply line L.

<Switching Control of Brake F1>

In this embodiment, the brake F1 is in the rotation inhibition state in the reverse range. When switching from the forward range or non-running range to the reverse range, the brake F1 can be switched from the one-way rotation permission state to the rotation inhibition state. At this time, to reduce unusual noise or vibration, the difference between the rotation speed of the brake F1 on the side of the casing 12 and that on the side of the carrier Cr2 is preferably 0. In other words, the rotation speed of the carrier Cr2 is preferably 0.

To do this, a combination of engaging mechanisms that changes the rotation speed of the carrier Cr2 to 0 intervenes. In this embodiment, there is no sensor for directly measuring the rotation speed of the carrier Cr2. For this reason, the carrier Cr2 and the input shaft 10 are connected, and it is confirmed from the detection result of the input shaft rotation speed sensor 111 or the like that the rotation speed of the carrier Cr2 is 0. After that, the brake F1 is switched to the rotation inhibition state.

FIG. 5 shows the engaging combination of engaging mechanisms when switching the gear range from the first forward range to the reverse range. When the gear range is the first forward range, the brakes B1 and B2 are in the engaging state, as shown in FIG. 2A. The brake F1 is assumed to be in the one-way rotation permission state.

First, as indicated by step 1 in FIG. 5, the brakes B1 and B2 are controlled to the release state. When release of the brakes B1 and B2 starts, the process advances to step 2.

In step 2, the clutches C1 and C3 and the brake B3 engage. The ring gear R2 and the output shaft 13 are rotatable, and the driving wheels can freely rotate. It is therefore possible to avoid an unexpected behavior of the vehicle.

As is apparent from the velocity diagram of FIG. 3, when the clutch C3 and the brake B3 engage, the input shaft 10 is fixed to the casing 12. When the clutch C1 engages, the carrier Cr2 is connected to the input shaft 10.

On the other hand, if the driving wheels are freely rotatable, the sense of response to the shift operation to the reverse range (more specifically, the sense of deceleration of the vehicle) may be weak. To prevent this, when a predetermined condition is met, processing (half-engagement control) of causing the driver to feel the sense of response is performed. Although details will be described later, in this embodiment, the brake B2 is maintained in a half-engaging state without being completely released. The brake B1 is completely released, or maintained in the half-engaging state and then completely released.

If predetermined conditions are met, the process advances to step 3. The predetermined conditions are conditions to confirm that the rotation speed of the carrier Cr2 is 0. Basically, the conditions are completion of engagement of the clutch C1 and detection result of input shaft rotation speed sensor 111<predetermined value (for example, a value that can be regarded as 0). As for completion of engagement of the clutch C1, for example, when the detection result of the oil pressure sensor 113 of the clutch C1 indicates a predetermined oil pressure or when the control amount of the solenoid valve LS for the clutch C1 reaches a predetermined value, it can be determined that engagement is completed. The same determination method can be employed even for completion of engagement of other engaging mechanisms.

In step 3, the brake F1 is switched from the one-way rotation permission state to the rotation inhibition state. Since the difference between the rotation speed of the brake F1 on the side of the casing 12 and that on the side of the carrier Cr2 is 0, occurrence of unusual noise or vibration can be avoided. When switching of the brake F1 is completed, the process advances to step 4. In step 4, the clutch C1 and the brake B3 are released, and the brake B2 engages. The combination for the reverse range thus holds (FIG. 2A).

In some cases, the processing in steps 1 to 3 is called RVS preparation processing, and the processing of step 4 is called RVS in-gear processing. In terms of control, when an RVS preparation mode is set as the control state of the gear range, RVS preparation processing is performed. In addition, when step 3 is completed, an RVS in-gear mode is set as the control state of the gear range. When the RVS in-gear mode is set, RVS in-gear processing is performed. Such mode setting is managed by, for example, providing a mode information storage area in the storage unit 102. An example of processing executed by the processing unit 101 concerning the control contents shown in FIG. 5 will be described later with reference to FIGS. 7 to 9.

<Half-Engagement Control>

If the shift position is switched from the D range to the R range, in this embodiment, the reverse range is sometimes put in gear after the state of the brake F1 is switched by the above-described RVS preparation processing. In this case, a slight time lag may be generated until establishment of the reverse range. In the RVS preparation processing, the plurality of engaging mechanisms C1, C3, and B3 engage. As already described, if only the engagement of these engaging mechanisms is established, the driving wheels are freely rotatable. In a state in which the vehicle has a speed to some extent, the vehicle does not decelerate during the RVS preparation processing even if the shift position is switched to the R range. The driver can hardly feel the sense of response (sense of deceleration) to the switching to the R range.

In this embodiment, an engaging combination that brakes the output member 11 is selected in accordance with the traveling state of the vehicle, thereby generating the sense of response to switching to the R range by the driver. The engaging combination itself that brakes the output member 11 is a combination that internally locks the automatic transmission 1 after completion of engagement. However, complete lock may lead to a large shock or a fault of the automatic transmission 1. Hence, the sense of deceleration is adjusted by half-engaging some engaging mechanisms. A detailed example will be described below.

Figure 6:
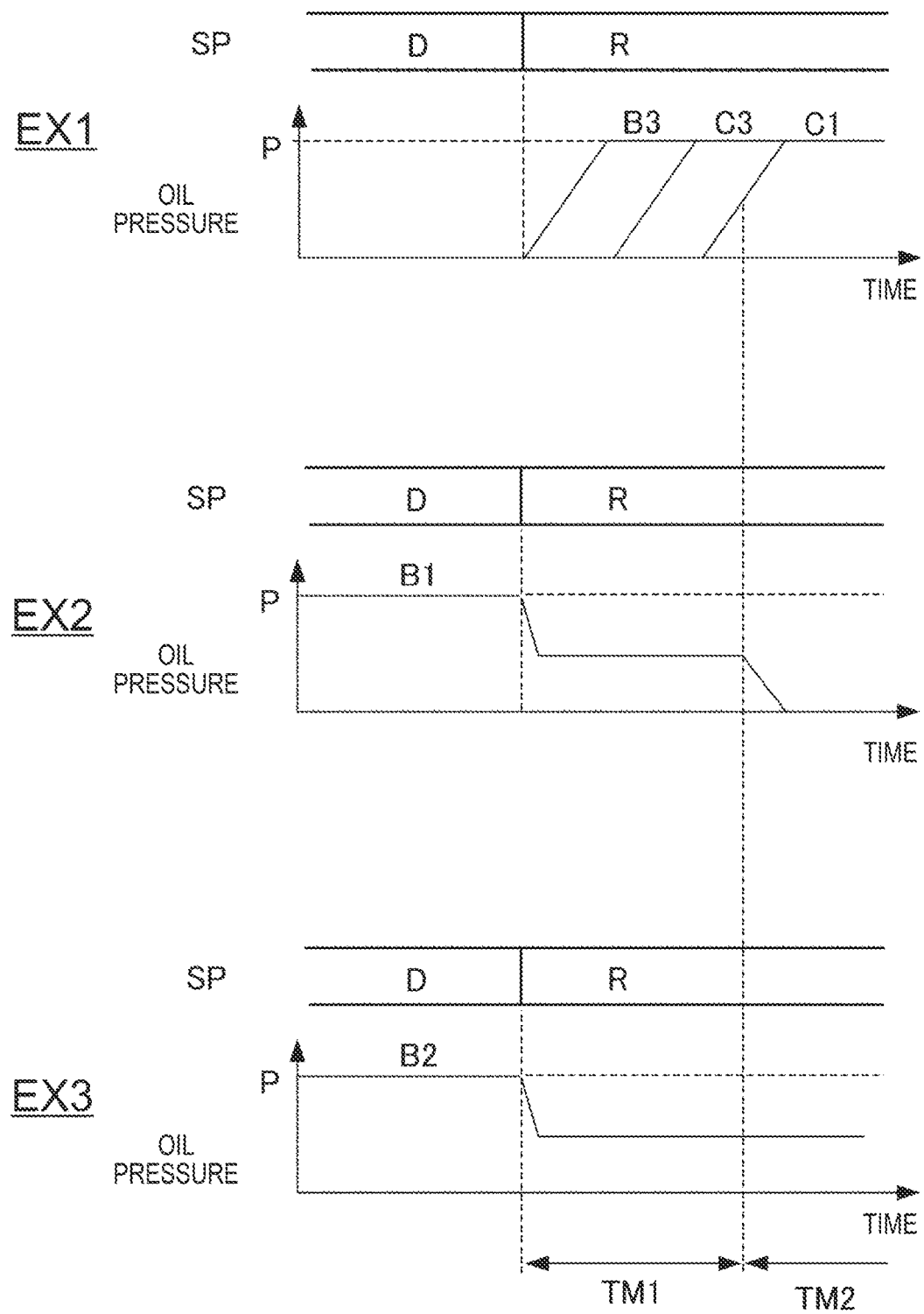
FIG. 6 shows timing charts illustrating examples of control.

FIG. 6 shows timing charts illustrating changes in oil pressures supplied to the engaging mechanisms C1, C3, and B1 to B3 in RVS preparation processing. "P" indicates an oil pressure when engagement is completed.

EX1 in FIG. 6 shows an example in which the engaging mechanisms C1, C2, and B3 engage. When a shift position SP is switched from the D range to the R range, RVS preparation processing starts, and the hydraulic oil is supplied to the engaging mechanisms C1, C3, and B3 with time lags. The engaging mechanisms B3 and C3 are engaged preferentially, and the engaging mechanism C1 is then engaged. This means that after the input shaft 10 is fixed, the engaging mechanism C1 engages to reduce the rotation speed of the carrier Cr2 to 0. The hydraulic oil may simultaneously be supplied to the engaging mechanisms C1, C3, and B3. However, when the hydraulic oil is supplied with time lags, unusual noise or vibration becomes small.

EX2 in FIG. 6 shows an example in which the engaging mechanism B1 is half-engaged and then released. When the shift position SP is switched from the D range to the R range, RVS preparation processing starts, and release of the engaging mechanism B1 starts. However, the engaging mechanism B1 is not completely released, and the hydraulic oil is supplied so as to generate an engaging force to some extent. Release of the engaging mechanism B1 may be done at the end of the RVS preparation processing. In this embodiment, when the engaging mechanism C1 generates an engaging force to some extent (when the oil pressure of the engaging mechanism C1 reaches a predetermined oil pressure), the half-engaging state is ended to release the engaging mechanism B1. In this embodiment, the engaging mechanism B1 is released via the half-engaging state, or released without half-engaging in accordance with the traveling state of the vehicle, as shown in EX2. Details will be described later.

EX3 in FIG. 6 shows an example in which the engaging mechanism B2 is half-engaged. When the shift position SP is switched from the D range to the R range, RVS preparation processing starts, and release of the engaging mechanism B2 starts. However, the engaging mechanism B2 is not completely released, and the hydraulic oil is supplied so as to generate an engaging force (oil pressure) to some extent. This state is maintained during the RVS preparation processing. The engaging mechanism B2 engages in the reverse range (FIG. 2A). Hence, when the engaging mechanism B2 is set in the half-engaging state during the RVS preparation processing, the time necessary to put the reverse range in gear can be shortened.

Braking of the output member 11 during RVS preparation processing in the example shown in FIG. 6 will be described next. During a period TM1 from the start of RVS preparation processing until the oil pressure of the engaging mechanism C1 reaches a predetermined oil pressure, the engaging mechanisms B3, C3, B1, and B2 exert the engaging force. If all of these engaging mechanisms complete engagement, the automatic transmission 1 internally locks, as is apparent from FIG. 3. However, since the engaging mechanisms B1 and B3 are set in the half-engaging state, the automatic transmission 1 can give a resistance to the rotation of the output member 11 (the rotation of the ring gear R2) and decelerate the vehicle without internally locking.

During a period TM2 after the oil pressure of the engaging mechanism C1 has reached the predetermined oil pressure until the RVS preparation processing ends, the engaging mechanisms B3, C3, C1, and B2 exert the engaging force. If all of these engaging mechanisms complete engagement, the automatic transmission 1 internally locks, as is apparent from FIG. 3. However, since the engaging mechanism B2 is set in the half-engaging state, the automatic transmission 1 can give a resistance to the rotation of the output member 11 (the rotation of the ring gear R2) and decelerate the vehicle without internally locking.

In this way, in both the periods TM1 and TM2, it is possible to give a resistance to the rotation of the output member 11 and decelerate the vehicle.

The degree of deceleration can be adjusted by, for example, the engaging force (oil pressure) of half-engagement of the engaging mechanism B2. The engaging force of half-engagement of the engaging mechanism B2 can be either a fixed value or a variable value. In a case in which the engaging force is a variable value, the engaging force may be increased (the degree of deceleration may be increased) in accordance with an accelerator operation by the driver.

Note that in this embodiment, the two engaging mechanisms B1 and B2 are subject to half-engagement control. Depending on the arrangement of the automatic transmission 1, the number of targets can be one or may be three or more.

<Another Example of RVS Preparation Processing>

To end the RVS preparation processing in a short time, one of the three engaging mechanisms C1, C3, and B3 (for example, B3) may engage or half-engage when the D range is being selected. In the arrangement of the automatic transmission 1 according to this embodiment, when the brake F1 is set in the one-way rotation permission state, and the engaging combination for the first range (1st) shown in FIG. 2A is set, the engine brake is switched between the enabled state and the disabled state by engaging/releasing the engaging mechanism B3. Hence, even if pre-engagement of the engaging mechanism B3 is started, running is not hindered. Hence, for example, in a stop state or at a low speed, the engaging mechanism B3 may engage or half-engage to prepare for switching to the R range.

<Switching Control to Reverse Range>

An example of processing executed by the processing unit 101 concerning the control contents shown in FIG. 5 will be described with reference to FIGS. 7 to 9.

Figure 7:
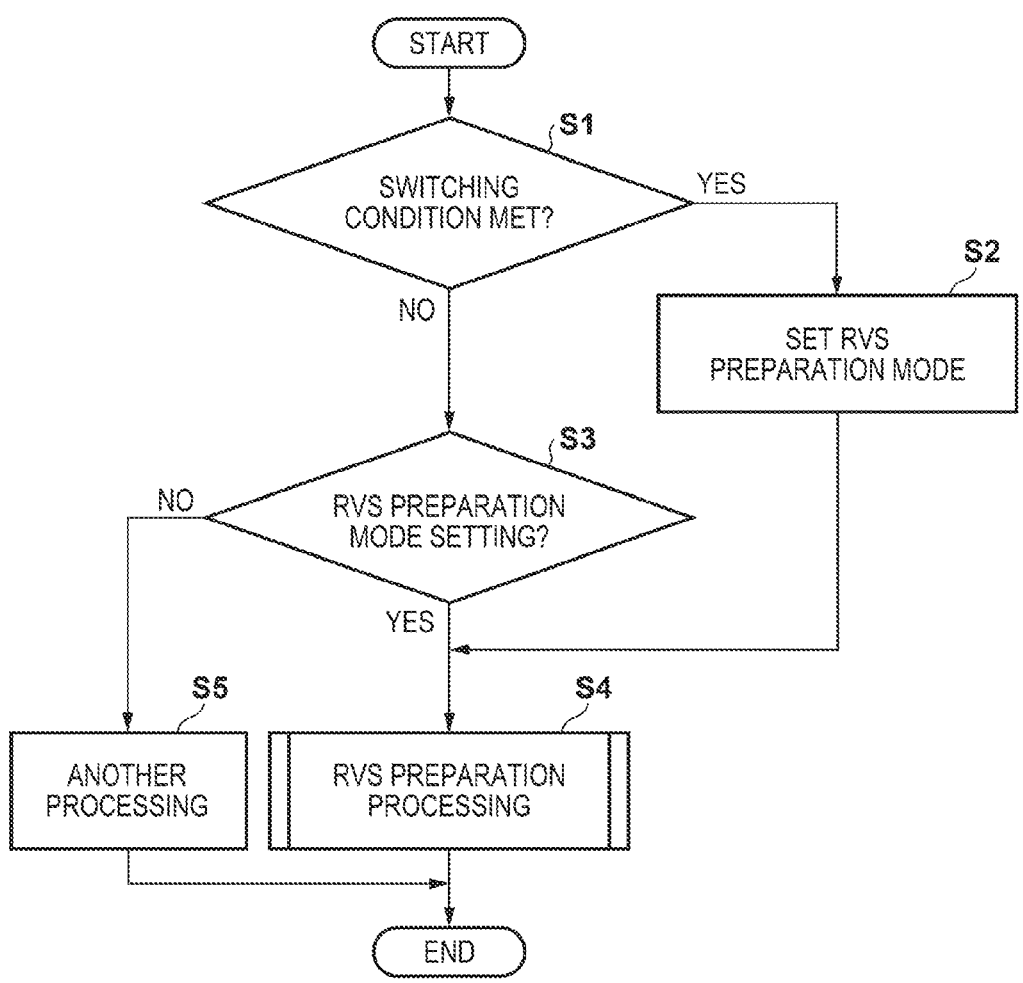
FIG. 7 is a flowchart showing an example of processing of the control apparatus shown in FIG. 4A.

FIG. 7 will be referred to first. In step S1, it is determined whether a condition to switch the brake F1 from the one-way rotation permission state to the rotation inhibition state is met. In this embodiment, if the brake F1 is in the one-way rotation permission state, and the SP sensor 112 detects that the driver has switched the shift range from the D range (for example, the first range) to the reverse range, it is determined that the condition is met. If YES in step S1, the process advances to step S2. Otherwise, the process advances to step S6.

In step S2, the RVS preparation mode is set as the control mode. After that, the process advances to step S4. In step S3, it is determined whether the RVS preparation mode is set. If YES in step S3, the process advances to step S4. Otherwise, the process advances to step S5. In step S4, RVS preparation processing is performed. Details will be described later. In step S5, another processing is performed, and the processing of one unit ends.

Figure 8:
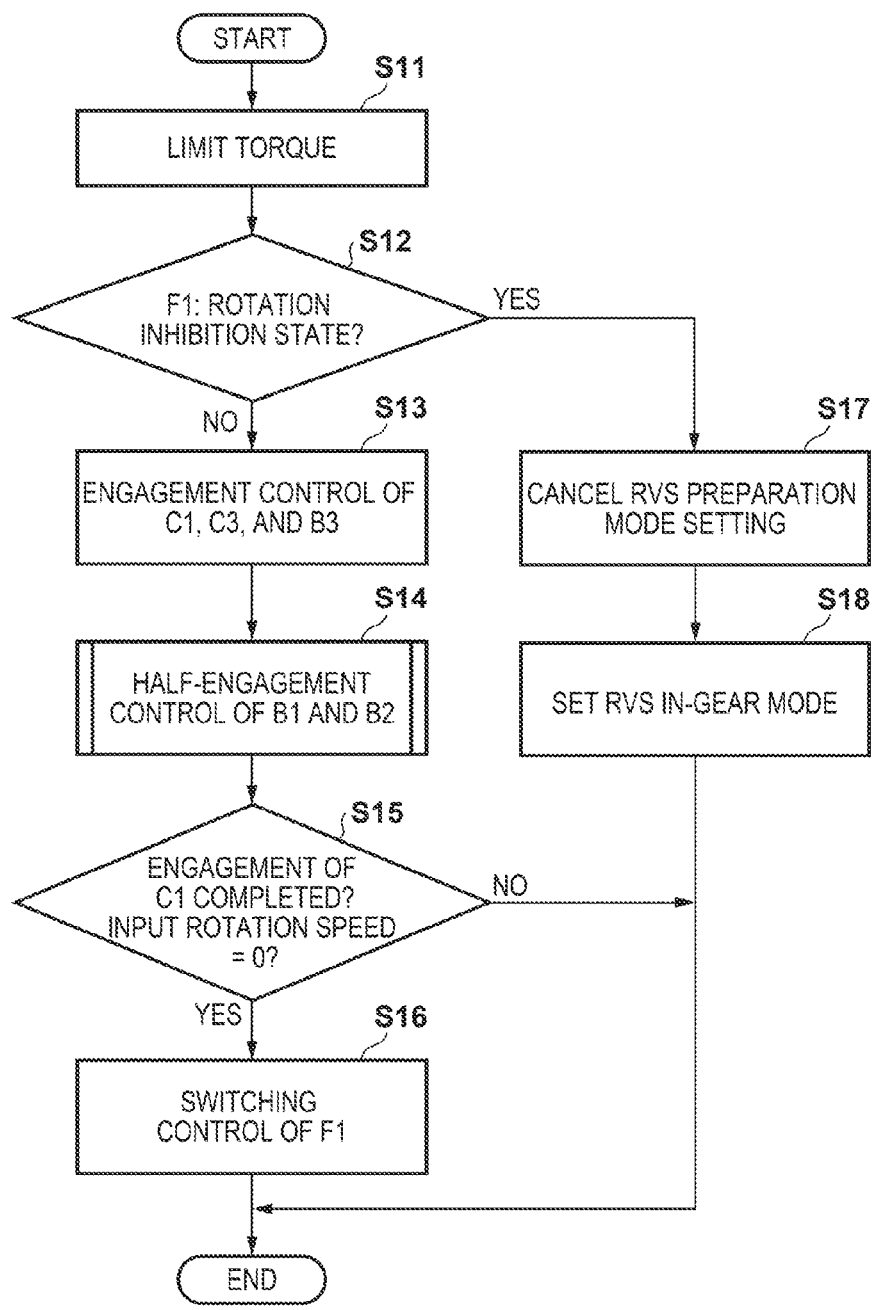
FIG. 8 is a flowchart showing an example of processing of the control apparatus shown in FIG. 4A.

FIG. 8 will be referred to. FIG. 8 is a flowchart showing RVS preparation processing of step S4. In step S11, torque limitation of the driving source of the automatic transmission 1 is performed. For example, the output of the internal combustion engine EG is reduced within the range in which the necessary oil pressures of the engaging mechanisms and the like are ensured.

In step S12, it is determined whether switching of the brake F1 to the rotation inhibition state is completed. If YES in step S12, the process advances to step S17. Otherwise, the process advances to step S13.

In step S13, control to engage the engaging mechanisms C1, C3, and B3 starts, as described concerning step 2 shown in FIG. 5 or EX1 shown in FIG. 6. When the process of step S13 is repeated a plurality of times, the engagement of the three engaging mechanisms C1, C3, and B3 is completed.

In step S14, half-engagement control of the engaging mechanisms B1 and B2 is performed, as described concerning EX2 and EX3 shown in FIG. 6. Half-engagement control of step S14 is thus executed in parallel to the engagement control of step S13. Details of the processing contents of half-engagement control will be described later.

In step S15, it is determined whether engagement of the clutch C1 is completed, and the rotation speed of the input shaft 10 is 0. If all the conditions are met, the process advances to step S16. If not all the conditions are met, the processing of one unit ends.

In step S16, the state of the brake F1 is switched to the rotation inhibition state, as described concerning step 3 shown in FIG. 5. Since the switching is done in a state in which the difference between the rotation speed of the brake F1 on the side of the casing 12 and that on the side of the carrier Cr2 is 0, it is possible to prevent occurrence of unusual noise or vibration and avoid breakage of the brake F1.

In step S17, setting of the RVS preparation mode is canceled. In step S18, the RVS in-gear mode is set. With this setting, processing of releasing the engaging mechanisms C1 and B3 and engaging the engaging mechanism B2 is performed, as described concerning step 4 shown in FIG. 5, in another routine (for example, step S5 in FIG. 7). The processing thus ends.

Figure 9:
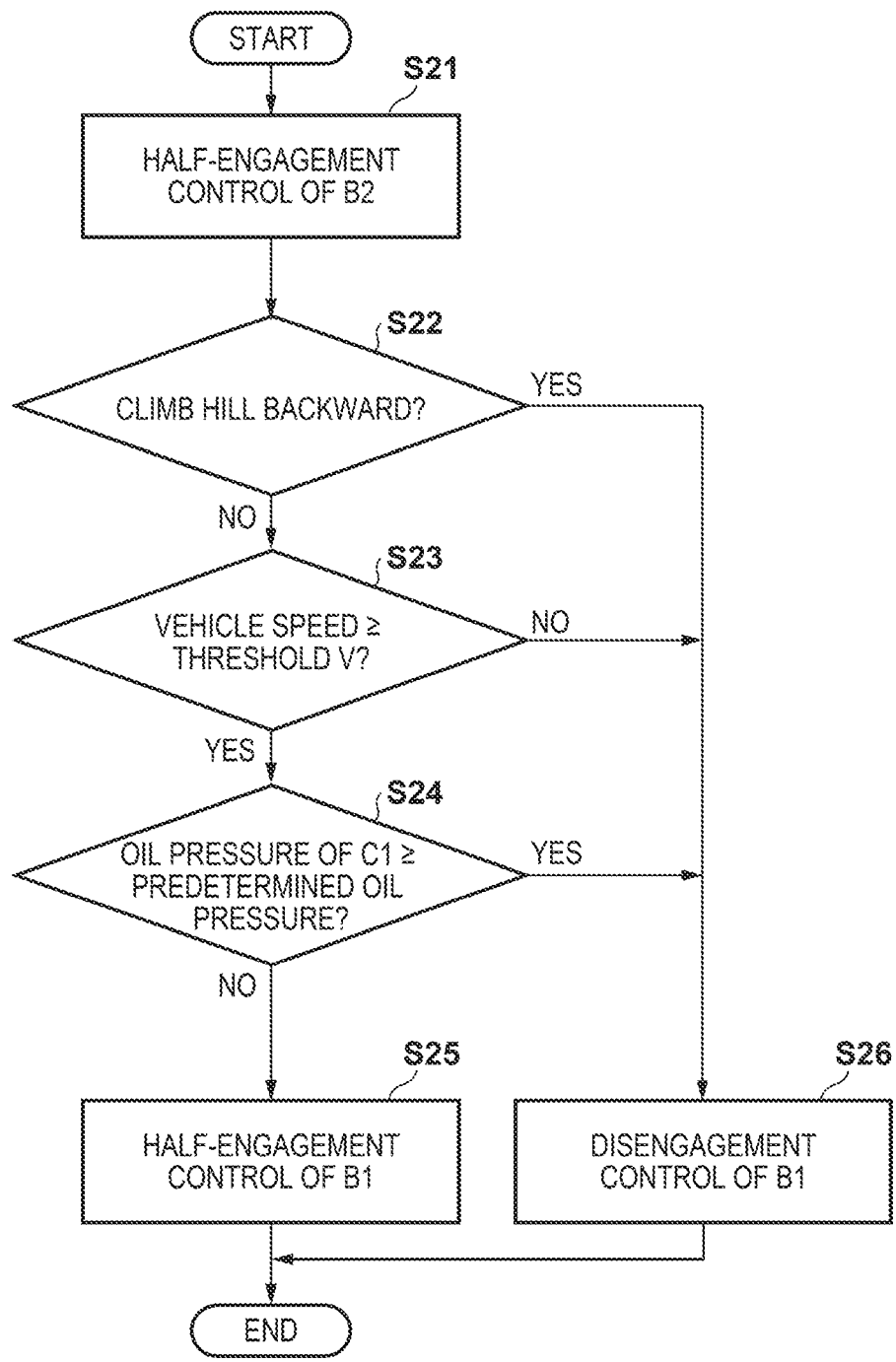
FIG. 9 is a flowchart showing an example of processing of the control apparatus shown in FIG. 4A.

FIG. 9 will be referred to. FIG. 9 is a flowchart showing half-engagement control processing of step S14. In step S21, half-engagement control of the engaging mechanism B2 is performed. Here, release of the engagement of the engaging mechanism B2 is started, as shown in EX3 of FIG. 6. However, the engaging mechanism B2 is not completely released, and the hydraulic oil is supplied so as to generate an engaging force to some extent.

In step S22, it is determined based on the detection results of the slope sensor 115 and the vehicle speed sensor 114 whether the vehicle is climbing a hill backward. If the vehicle is climbing a hill backward, the process advances to step S26. If the vehicle is not climbing a hill backward, the process advances to step S23. In a little special situation in which, for example, the vehicle enters a byroad backward during forward traveling on an ascending road, when the shift position is switched from the D range to the R range, a state in which the vehicle coasts backward along the uphill road may occur. In this case, if the output member 11 is braked, the vehicle may jump in the forward direction. Hence, to avoid half-engagement control of the engaging mechanism B1, the process advances to step S26. Reversely, if the vehicle is not climbing a hill backward, processing of step S25 (to be described later) can be executed to make the driver feel the sense of response.

In step S23, it is determined whether the speed detection result of the vehicle speed sensor 114 is equal to or more than a threshold V. If the speed detection result is equal to or more than the threshold V, the process advances to step S24. If the speed detection result is less than the threshold V, the process advances to step S26.

As the threshold V, a vehicle speed appropriate for causing the driver to feel the sense of response (sense of deceleration) of the shift operation is set. For example, several km/h (more specifically, 1 km/h or 2 km/h) is set. If the speed detection result is equal to or more than the threshold V, processing of step S25 (to be described later) can be executed to make the driver feel the sense of response. If the speed detection result is less than the threshold V, the necessity of making the driver feel the sense of response is low. To avoid wasteful consumption of the oil pressure, the process advances to step S26.

In step S24, it is determined based on the detection result of the oil pressure sensor 113 whether the oil pressure of the engaging mechanism C1 is equal to or more than the predetermined oil pressure, as described concerning EX2 shown in FIG. 6. If the oil pressure is equal to or more than the predetermined oil pressure, the process advances to step S26. If the oil pressure is less than the predetermined oil pressure, the process advances to step S25.

In step S25, half-engagement control of the engaging mechanism B1 is performed. Here, as shown in EX2 of FIG. 6, release of engagement of the engaging mechanism B1 starts. However, the engaging mechanism B1 is not completely released, and the hydraulic oil is supplied so as to generate an engaging force to some extent. The output member 11 is thus braked during the period TM1 shown in FIG. 6, and the driver can be made to feel the sense of response.

In step S26, disengagement control of the engaging mechanism B1 is performed. Here, the engaging mechanism B1 is released. When the half-engagement control of step S25 is performed, the engaging mechanism B1 is set in the release state in the period TM2. When the half-engagement control of step S25 is not performed, the engaging mechanism B1 is set in the release state in both the periods TM1 and TM2. The driver is made to feel the sense of response only in the period TM2. The processing thus ends.

<Another Example of Processing>

In this embodiment, since the half-engaging state of the engaging mechanism B2 is maintained during RVS preparation processing by the processing of step S21, the output member 11 is always braked during the period TM2. However, in a case in which half-engagement control of the engaging mechanism B1 in step S25 is not performed (that is, in a case in which the output member 11 is not braked during the period TM1), the engaging mechanism B2 may be released. Accordingly, in the case in which the output member 11 is not braked during the period TM1, the output member 11 is not braked during the period TM2 as well.

Figure 10:
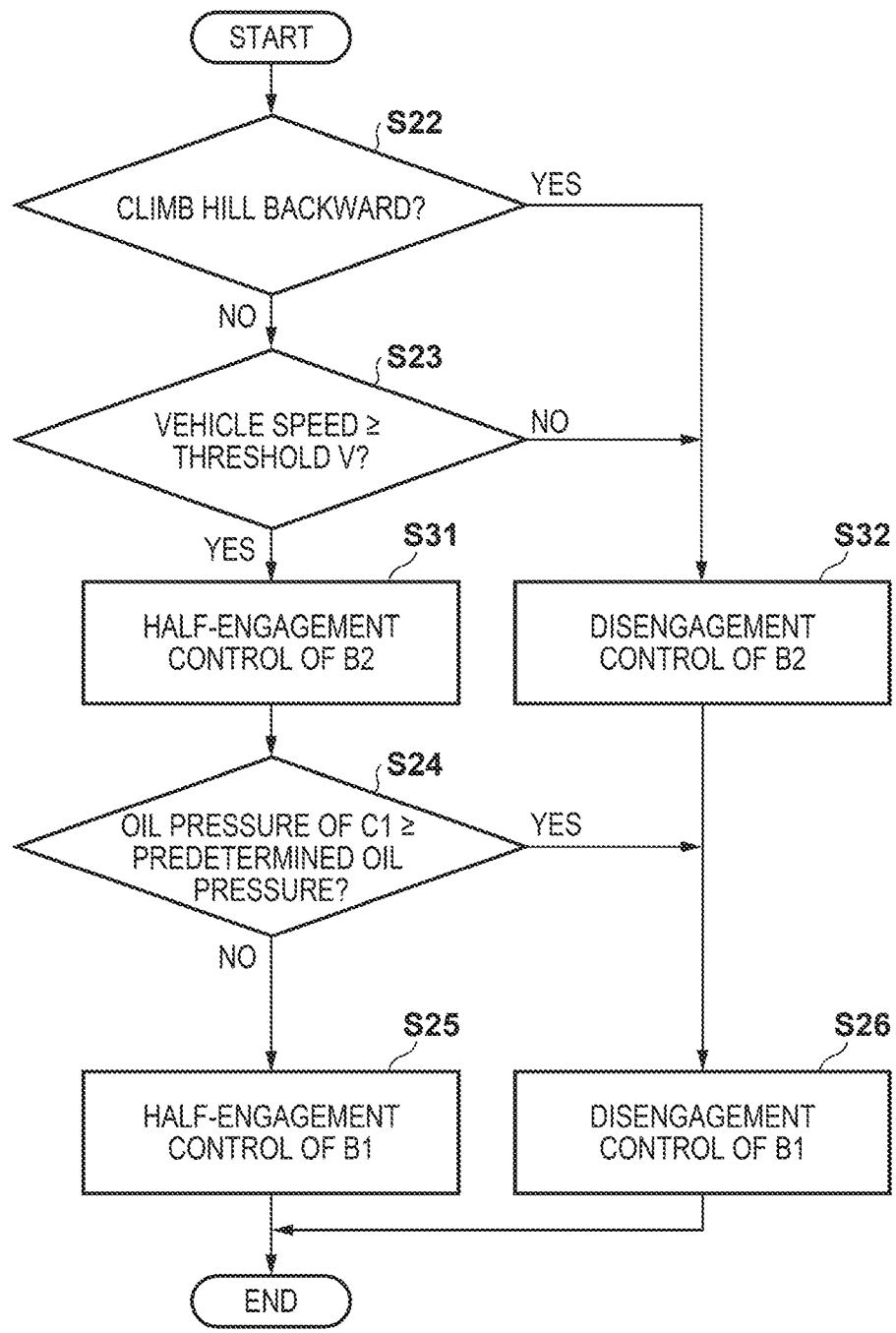
FIG. 10 is a flowchart showing an example of processing of the control apparatus shown in FIG. 4A.

FIG. 10 is a flowchart showing the half-engagement control processing of step S14, replacing FIG. 9.

In the processing example shown in FIG. 10, the processes of steps S22 and S23 are the same as the processes of steps S22 and S23 shown in FIG. 9. Upon determining in step S22 that the vehicle is not climbing a hill backward and in step S23 that the speed detection result is equal to or more than the threshold V, the process advances to step S31 to perform half-engagement control of the engaging mechanism B2. The contents are the same as those of the processing of step S21 shown in FIG. 9.

Upon determining in step S22 that the vehicle is climbing a hill backward or in step S23 that the speed detection result is less than the threshold V, the process advances to step S32 to perform disengagement control of the engaging mechanism B2. Here, the engaging mechanism B2 is released. The processes of steps S24 to S26 are the same as the processes of steps S24 to S26 shown in FIG. 9.

In the processing example shown in FIG. 10, if it is necessary to make the driver feel the sense of response, the output member 11 is braked in both the periods TM1 and TM2. If it is not necessary to make the driver feel the sense of response, the output member 11 is braked in neither of the periods TM1 and TM2.

SUMMARY OF EMBODIMENT

1. A control apparatus (for example, 100) according to the embodiment is a control apparatus for an automatic transmission (for example, 1),
the automatic transmission including:
an input shaft (for example, 10) to which a driving force is input;
an output member (for example, 11);
a plurality of planetary gear mechanisms (for example, P1 to P4) configured to transmit the driving force input to the input shaft to the output member; and
a plurality of engaging mechanisms (for example, C1 to C3, B1 to B3, F1) capable of establishing a plurality of gear ranges by switching a transmission path of the driving force in the plurality of planetary gear mechanisms,
wherein the plurality of engaging mechanisms include:
a mechanical engaging mechanism (for example, F1) configured to function as a brake; and
a plurality of hydraulic friction engaging mechanisms (for example, C1 to C3, B1 to B3),
the mechanical engaging mechanism can be switched between a first state in which rotation of a predetermined rotational element (for example, Cr1, Cr2), out of a plurality of rotational elements included in the plurality of planetary gear mechanisms, is restricted only in one direction and a second state in which the rotation of the predetermined rotational element is restricted in both directions,
the plurality of gear ranges include:
at least one forward range (for example, 1st-10th) that can be established in the first state of the mechanical engaging mechanism; and
a reverse range (for example, RVS) to be established in the second state of the mechanical engaging mechanism,
the control apparatus comprising:
a detection unit (for example, 112) configured to detect a shift position; and
a control unit (for example, 101) configured to control the plurality of engaging mechanisms,
wherein the control unit can execute switching control to switch the mechanical engaging mechanism from the first state to the second state when switching of the shift position from the forward range to the reverse range is detected (for example, S4),
in the switching control, after engagement control (for example, S13) for setting a plurality of hydraulic friction engaging mechanisms (for example, C1, C3, B3) selected from the plurality of hydraulic friction engaging mechanisms in an engaging state, the mechanical engaging mechanism is switched from the first state to the second state (for example, S16), and
the control unit can execute half-engagement control (for example, S14) to brake the output member by setting at least one hydraulic friction engaging mechanism (for example, B1, B2) selected from the plurality of hydraulic friction engaging mechanisms in a half-engaging state in parallel to the engagement control.

According to this arrangement, it is possible to suppress unusual noise or vibration by the engagement control when switching the mechanical engaging mechanism, and improve the sense of response to the shift operation from the forward range to the reverse range by breaking the output member.

2. The control apparatus according to the embodiment further comprises a detection unit (for example, 114) configured to detect a vehicle speed,
wherein the half-engagement control can be executed when a detected vehicle speed is not less than a threshold (for example, S23).

According to this arrangement, it is possible to prevent an oil pressure from being wastefully consumed in a case in which it is not necessary to make the driver feel the sense of response.

3. In the control apparatus according to the embodiment, the control unit can determine whether a vehicle is climbing a hill backward (for example, S22), and
the half-engagement control can be executed upon determining that the vehicle is not climbing a hill backward.

According to this arrangement, it is possible to suppress jumping of the vehicle in the forward direction during backward traveling on an uphill road.

4. In the control apparatus according to the embodiment, the plurality of hydraulic friction engaging mechanisms selected in the engagement control include:
a first hydraulic friction engaging mechanism (for example, B3, C3); and
a second hydraulic friction engaging mechanism (for example, C1) configured to engage later than the first hydraulic friction engaging mechanism in the engagement control,
in the half-engagement control, a third hydraulic friction engaging mechanism (for example, B1) and a fourth hydraulic friction engaging mechanism (for example, B2) are set in a half-engaging state,
the half-engaging state of the third hydraulic friction engaging mechanism is canceled in accordance with a degree of engagement of the second hydraulic friction engaging mechanism (for example, S24), and
the fourth hydraulic friction engaging mechanism is continuously set in the half-engaging state during the engagement control (for example, S21).

According to this arrangement, it is possible to continue braking of the output member in correspondence with the engagement timings of the plurality of hydraulic friction engaging mechanisms.

5. The control apparatus according to the embodiment further comprises a detection unit (for example, 114) configured to detect a vehicle speed, wherein when a detected vehicle speed is less than a threshold, in the half-engagement control, the third hydraulic friction engaging mechanism is not set in the half-engaging state but set in a release state (for example, S23, S26).

According to this arrangement, it is possible to prevent an oil pressure from being wastefully consumed in a case in which it is not necessary to make the driver feel the sense of response.

6. In the control apparatus according to the embodiment, the control unit can determine whether a vehicle is climbing a hill backward (for example, S22), and upon determining that the vehicle is not climbing a hill backward, in the half-engagement control, the third hydraulic friction engaging mechanism is not set in the half-engaging state but set in a release state (for example, S22, S26).

According to this arrangement, it is possible to suppress jumping of the vehicle in the forward direction during backward traveling on an uphill road.

7. In the control apparatus according to the embodiment, out of the plurality of gear ranges, a lowest-speed forward range (for example, 1st) is established when at least the third hydraulic friction engaging mechanism and the fourth hydraulic friction engaging mechanism are in an engaging state, and the mechanical engaging mechanism is in the first state, and the reverse range is established when at least the fourth hydraulic friction engaging mechanism is in the engaging state, at least the third hydraulic friction engaging mechanism is in a release state, and the mechanical engaging mechanism is in the second state.

According to this arrangement, the fourth hydraulic friction engaging mechanism is maintained in the half-engaging state during the engagement control, thereby establishing the reverse range later in a shorter time.

8. In the control apparatus according to the embodiment, the first hydraulic friction engaging mechanism comprises a hydraulic friction engaging mechanism configured to change a rotation speed of the input shaft to 0, and the second hydraulic friction engaging mechanism comprises a hydraulic friction engaging mechanism configured to disconnect the predetermined rotational element and the input shaft.

According to this arrangement, it is possible to suppress unusual noise or vibration caused by switching of the mechanical engaging mechanism and also lower the probability of breakage of the mechanical engaging mechanism.

9. In the control apparatus according to the embodiment, the plurality of hydraulic friction engaging mechanisms selected in the engagement control are hydraulic friction engaging mechanisms selected so as to change a rotation speed of the predetermined rotational element (for example, Cr1, Cr2) to 0 by engagement.

According to this arrangement, it is possible to suppress unusual noise or vibration caused by switching of the mechanical engaging mechanism and also lower the probability of breakage of the mechanical engaging mechanism.

10. In the control apparatus according to the embodiment, the plurality of hydraulic friction engaging mechanisms selected in the engagement control are hydraulic friction engaging mechanisms that do not restrict rotation of the output member by engagement.

According to this arrangement, it is possible to restrict the rotation of driving wheels as needed and make the driver feel the sense of response to the shift operation while making the driving wheels freely rotatable during the engagement control.

While the present invention has been described with reference to exemplary embodiments, it is to be understood that the invention is not limited to the disclosed exemplary embodiments. The scope of the following claims is to be accorded the broadest interpretation so as to encompass all such modifications and equivalent structures and functions.

What is claimed is:

1. A control apparatus for an automatic transmission, the automatic transmission including:
an input shaft to which a driving force is input;
an output member;
a plurality of planetary gear mechanisms configured to transmit the driving force input to the input shaft to the output member; and
a plurality of engaging mechanisms capable of establishing a plurality of gear ranges by switching a transmission path of the driving force in the plurality of planetary gear mechanisms,
wherein the plurality of engaging mechanisms include:
a mechanical engaging mechanism configured to function as a brake; and
a plurality of hydraulic friction engaging mechanisms,
the mechanical engaging mechanism can be switched between a first state in which rotation of a predetermined rotational element, out of a plurality of rotational elements included in the plurality of planetary gear mechanisms, is restricted only in one direction and a second state in which the rotation of the predetermined rotational element is restricted in both directions,
the plurality of gear ranges include:
at least one forward range that can be established in the first state of the mechanical engaging mechanism; and
a reverse range to be established in the second state of the mechanical engaging mechanism,
the control apparatus comprising:
a detection unit configured to detect a shift position; and
a control unit configured to control the plurality of engaging mechanisms,
wherein the control unit can execute switching control to switch the mechanical engaging mechanism from the first state to the second state when switching of the shift position from the forward range to the reverse range is detected,
in the switching control, after engagement control for setting at least one hydraulic friction engaging mechanisms selected from the plurality of hydraulic friction engaging mechanisms in an engaging state, the mechanical engaging mechanism is switched from the first state to the second state, and
the control unit can execute half-engagement control to brake the output member by setting at least one hydraulic friction engaging mechanism selected from the plurality of hydraulic friction engaging mechanisms in a half-engaging state in parallel to the engagement control.

2. The apparatus according to claim 1, further comprising a speed detection unit configured to detect a vehicle speed,
wherein the half-engagement control can be executed when a detected vehicle speed is not less than a threshold.

3. The apparatus according to claim 1, wherein the control unit can determine whether a vehicle is climbing a hill backward, and
the half-engagement control can be executed upon determining that the vehicle is not climbing the hill backward.

4. The apparatus according to claim 1, wherein the plurality of hydraulic friction engaging mechanisms selected in the engagement control include:
a first hydraulic friction engaging mechanism; and
a second hydraulic friction engaging mechanism configured to engage later than the first hydraulic friction engaging mechanism in the engagement control,
in the half-engagement control, a third hydraulic friction engaging mechanism and a fourth hydraulic friction engaging mechanism are set in the half-engaging state,
the half-engaging state of the third hydraulic friction engaging mechanism is canceled in accordance with a degree of engagement of the second hydraulic friction engaging mechanism, and
the fourth hydraulic friction engaging mechanism is continuously set in the half-engaging state during the engagement control.

5. The apparatus according to claim 4, further comprising a speed detection unit configured to detect a vehicle speed,
wherein when a detected vehicle speed is less than a threshold, in the half-engagement control, the third hydraulic friction engaging mechanism is not set in the half-engaging state but set in a release state.

6. The apparatus according to claim 4, wherein the control unit can determine whether a vehicle is climbing a hill backward, and
upon determining that the vehicle is not climbing the hill backward, in the half-engagement control, the third hydraulic friction engaging mechanism is not set in the half-engaging state but set in a release state.

7. The apparatus according to claim 4, wherein out of the plurality of gear ranges, a lowest-speed forward range is established when at least the third hydraulic friction engaging mechanism and the fourth hydraulic friction engaging mechanism are in an another engaging state, and the mechanical engaging mechanism is in the first state, and
the reverse range is established when at least the fourth hydraulic friction engaging mechanism is in the engaging state, at least the third hydraulic friction engaging mechanism is in a release state, and the mechanical engaging mechanism is in the second state.

8. The apparatus according to claim 4, wherein the first hydraulic friction engaging mechanism comprises a hydraulic friction engaging mechanism configured to change a rotation speed of the input shaft to 0, and
the second hydraulic friction engaging mechanism comprises a hydraulic friction engaging mechanism configured to disconnect the predetermined rotational element and the input shaft.

9. The apparatus according to claim 1, wherein the plurality of hydraulic friction engaging mechanisms selected in the engagement control are hydraulic friction engaging mechanisms selected so as to change a rotation speed of the predetermined rotational element to 0 by engagement.

10. The apparatus according to claim 1, wherein the plurality of hydraulic friction engaging mechanisms selected in the engagement control are hydraulic friction engaging mechanisms that do not restrict rotation of the output member by engagement.

* * * * *